United States Patent
Hall et al.

(10) Patent No.: US 8,498,276 B2
(45) Date of Patent: Jul. 30, 2013

(54) GUARDIAN SCRUBBING STRATEGY FOR DISTRIBUTED TIME-TRIGGERED PROTOCOLS

(75) Inventors: Brendan Hall, Eden Prairie, MN (US); Paul F. Dietrich, Brooklyn Park, MN (US); Kevin R. Driscoll, Maple Grove, MN (US)

(73) Assignee: Honeywell International Inc., Morristown, NJ (US)

( * ) Notice: Subject to any disclaimer, the term of this patent is extended or adjusted under 35 U.S.C. 154(b) by 200 days.

(21) Appl. No.: 13/117,890

(22) Filed: May 27, 2011

(65) Prior Publication Data
US 2012/0300794 A1    Nov. 29, 2012

(51) Int. Cl.
| H04J 3/00 | (2006.01) |
| H04J 3/06 | (2006.01) |
| H04B 7/212 | (2006.01) |
| H04L 7/00 | (2006.01) |
| H03M 13/00 | (2006.01) |
| G06F 11/00 | (2006.01) |

(52) U.S. Cl.
USPC ........... 370/336; 370/345; 370/350; 370/510; 455/509; 375/356; 714/758; 714/798

(58) Field of Classification Search
USPC .. 370/503, 328, 350, 336, 345, 510; 455/509; 375/356; 714/758, 798
See application file for complete search history.

(56) References Cited

U.S. PATENT DOCUMENTS

| 4,059,736 A * | 11/1977 | Perucca et al. ............... 370/250 |
| 6,145,008 A | 11/2000 | Kopetz |
| 6,411,662 B1 * | 6/2002 | Sakoda et al. ............... 375/340 |
| 6,651,106 B1 | 11/2003 | Driscoll |
| 7,539,888 B2 | 5/2009 | Hu |
| 7,586,953 B2 | 9/2009 | Forest et al. |
| 7,586,954 B2 | 9/2009 | Hatananka |

(Continued)

FOREIGN PATENT DOCUMENTS

| EP | 2053830 | 4/2009 |
| WO | 0201785 | 1/2002 |
| WO | 2006067673 | 6/2006 |

OTHER PUBLICATIONS

"Flexray Communications System Protocol Specification Version 2.1 Revison A", Dec. 2005, pp. 1-245, Publisher: FlexRay Consortium.

(Continued)

*Primary Examiner* — Alpus H Hsu
*Assistant Examiner* — Anthony Luo
(74) *Attorney, Agent, or Firm* — Fogg & Powers LLC

(57) ABSTRACT

A cluster comprises a plurality of end nodes that communicate with one another over at least one communication channel. Each end node is assigned a time slot for transmission of frames; wherein each node comprises a local guardian configured to prevent transmission of timing-related frames sourced from the respective end node. The cluster also comprises a special node that communicates with the plurality of end nodes, wherein the special node establishes a time base and sources timing-related frames to the plurality of end nodes. The transmission schedule includes at least one common scrubbing time slot during which each of the plurality of end nodes is configured to generate a timing-related frame. The special node is configured to determine if the local guardian in any of the plurality of nodes failed to prevent transmission of the respective generated timing-related frame during the common scrubbing time slot.

20 Claims, 7 Drawing Sheets

U.S. PATENT DOCUMENTS

| | | |
|---|---|---|
| 7,788,667 B2 | 8/2010 | Jiang |
| 8,204,037 B2 * | 6/2012 | Poledna et al. ............... 370/350 |
| 2003/0154427 A1 | 8/2003 | Hermann |
| 2005/0094674 A1 | 5/2005 | Zinke et al. |
| 2005/0129037 A1 | 6/2005 | Zumsteg et al. |
| 2005/0141524 A1 | 6/2005 | Hall |
| 2005/0141565 A1 | 6/2005 | Forest et al. |
| 2005/0172167 A1 | 8/2005 | Driscoll |
| 2005/0198280 A1 | 9/2005 | Hall et al. |
| 2005/0254518 A1 | 11/2005 | Fujimori |
| 2005/0278457 A1 | 12/2005 | Hall et al. |
| 2006/0045133 A1 | 3/2006 | Temple |
| 2006/0224394 A1 | 10/2006 | Ungermann et al. |
| 2007/0116058 A1 | 5/2007 | Rausch |
| 2008/0098234 A1 | 4/2008 | Driscoll et al. |
| 2008/0101446 A1 * | 5/2008 | Gautier et al. ............... 375/222 |
| 2009/0041040 A1 | 2/2009 | Hall et al. |
| 2009/0122812 A1 | 5/2009 | Steiner et al. |
| 2009/0141744 A1 | 6/2009 | Poledna et al. |
| 2009/0262649 A1 | 10/2009 | Zinke et al. |
| 2009/0274095 A1 * | 11/2009 | Iwasa et al. ............... 370/328 |
| 2010/0002594 A1 | 1/2010 | Elend |
| 2011/0128855 A1 * | 6/2011 | Ando et al. ............... 370/236 |
| 2011/0164626 A1 * | 7/2011 | Temple et al. ............... 370/498 |

OTHER PUBLICATIONS

"Flexray Communication System: Protocol Specification Version 2.1 Revision A Errata Sheet", "www.flexray-group.com", Mar. 2006, pp. 1-8, Publisher: Flexray Consortium.

Steiner et al., "The Startup Problem in Fault-Tolerant Time-Triggered Communication", "International Conference on Dependable Systems and Networks (DSN'06)", 2006, pp. 1-20, Publisher: Computer Society.

European Patent Office, "Office Action", "from Foreign Counterpart of U.S. Application", Sep. 21, 2012, pp. 1-5, Published in: EP.

European Patent Office, "European Search Report", "from Foreign Counterpart of U.S. Application", Sep. 13, 2012, pp. 1-3, Published in: EP.

* cited by examiner

| Payload – Word | MSB | | | | | | | | | | | | | | | LSB |
|---|---|---|---|---|---|---|---|---|---|---|---|---|---|---|---|---|
| | 15 | 14 | 13 | 12 | 11 | 10 | 9 | 8 | 7 | 6 | 5 | 4 | 3 | 2 | 1 | 0 |
| 0 | Syc | Slot Width 14:8 | | | | | | | Slot Width 7:0 | | | | | | | |
| 1 | Enforcement Vector Slot 0 (16 :bits) | | | | | | | | | | | | | | | |
| 2 | Enforcement Vector Slot 1 | | | | | | | | | | | | | | | |
| 3 | Enforcement Vector Slot 2 | | | | | | | | | | | | | | | |
| 4 | Enforcement Vector Slot 3 | | | | | | | | | | | | | | | |
| 5 | Enforcement Vector Slot 4 | | | | | | | | | | | | | | | |
| 6 | Enforcement Vector Slot 5 | | | | | | | | | | | | | | | |
| 7 | Enforcement Vector Slot 6 | | | | | | | | | | | | | | | |
| 8 | Enforcement Vector Slot 7 | | | | | | | | | | | | | | | |
| 9 | Enforcement Vector Slot 8 | | | | | | | | | | | | | | | |
| 10 | Enforcement Vector Slot 9 | | | | | | | | | | | | | | | |
| 11 | Enforcement Vector Slot 10 | | | | | | | | | | | | | | | |
| 12 | Enforcement Vector Slot 11 | | | | | | | | | | | | | | | |
| 13 | Enforcement Vector Slot 12 | | | | | | | | | | | | | | | |
| 14 | Enforcement Vector Slot 13 | | | | | | | | | | | | | | | |
| 15 | Enforcement Vector Slot 14 | | | | | | | | | | | | | | | |
| 16 | Enforcement Vector Slot 15 | | | | | | | | | | | | | | | |
| 17 | Enforcement Vector Slot 16 | | | | | | | | | | | | | | | |

GUARDIAN SCRUBBING STRATEGY FOR DISTRIBUTED TIME-TRIGGERED PROTOCOLS

CROSS-REFERENCE TO RELATED APPLICATIONS

This application is related to U.S. patent application Ser. No. 12/198,611 entitled "AUTOCRATIC LOW COMPLEXITY GATEWAY/GUARDIAN STRATEGY AND/OR SIMPLE LOCAL GUARDIAN STRATEGY FOR FlexRay OR OTHER DISTRIBUTED TIME-TRIGGERED PROTOCOL" filed on Aug. 26, 2008 and which is referred to herein as the '611 application. The '611 application is incorporated herein by reference in its entirety.

BACKGROUND

As used herein, the phrase "distributed time-triggered protocol" means a communication protocol that enables a group of nodes to communicate using a time division multiple access (TDMA) scheme where the nodes employ a distributed clock synchronization algorithm to synchronize their local clocks to one another. One example of a distributed time-triggered protocol is the FlexRay time-triggered protocol developed by the FlexRay Consortium and described in detail in the FlexRay Protocol Specification V2.1 Rev. A and Protocol Specification V2.1. Rev. A Errata V1, both of which are incorporated herein by reference in their entirety. Some distributed time-triggered protocol systems use bus guardians to protect the network from component failure. One exemplary system employing a bus guardian strategy is described in the '611 application.

SUMMARY

In some embodiments, a cluster is provided. The cluster comprises a plurality of end nodes that communicate with one another over at least one communication channel using a distributed time-triggered communication protocol, each end node assigned a time slot in a transmission schedule for transmission of frames; wherein each node comprises a local guardian configured to prevent transmission of timing-related frames sourced from the respective end node; and a special node that communicates with the plurality of end nodes over the communication channel, wherein the special node comprises protocol functionality to establish a time base to use in communicating with the plurality of end nodes and to source timing-related frames to the plurality of end nodes in accordance with the distributed time-triggered communication protocol. The transmission schedule includes at least one common scrubbing time slot during which each of the plurality of end nodes is configured to generate a timing-related frame. The special node is configured to observe the at least one communication channel during the common scrubbing time slot to determine if the local guardian in any of the plurality of nodes failed to prevent transmission of the respective generated timing-related frame.

DRAWINGS

Understanding that the drawings depict only exemplary embodiments and are not therefore to be considered limiting in scope, the exemplary embodiments will be described with additional specificity and detail through the use of the accompanying drawings, in which FIG. 1 is a block diagram of one embodiment of a cluster having an autocratic node.

FIG. 3 illustrates one example of an exemplary autocratic enforcement data message used in the embodiment of FIG. 1.

Figure 5:
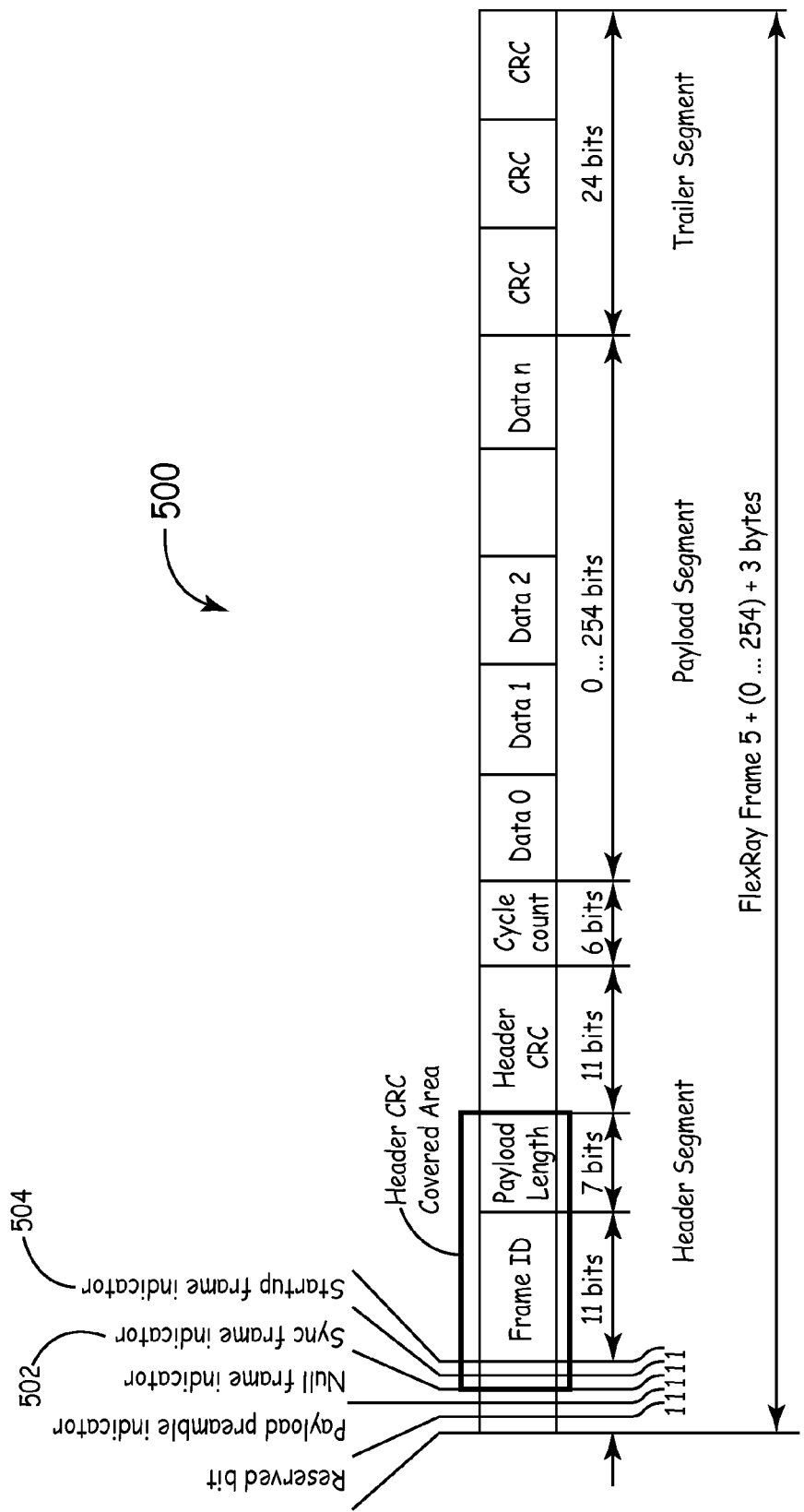

FIG. 5. is block diagram of another embodiment of a cluster having an autocratic node.

Figure 6:
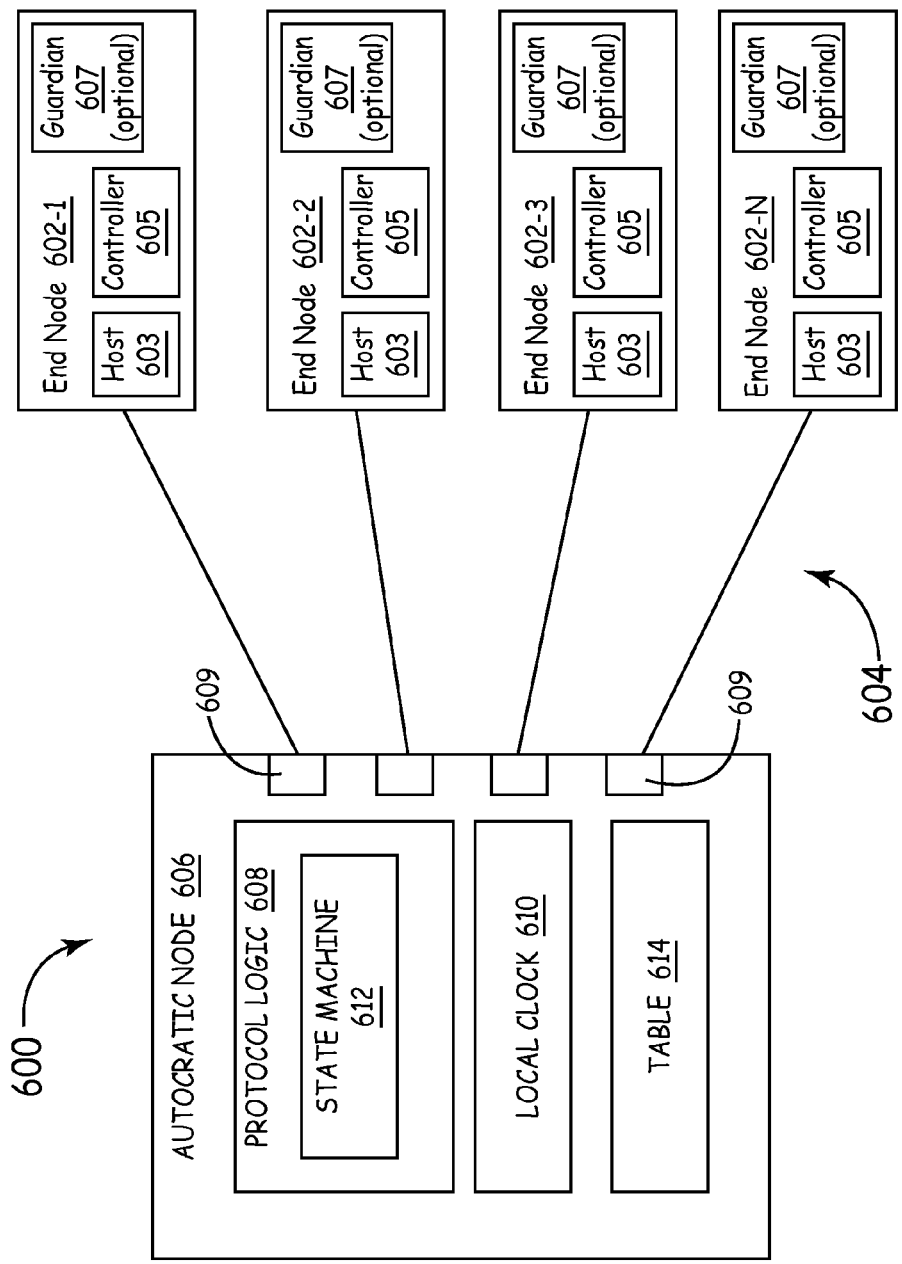

FIG. 6. is a block diagram illustrating the FlexRay frame format.

Figure 7:
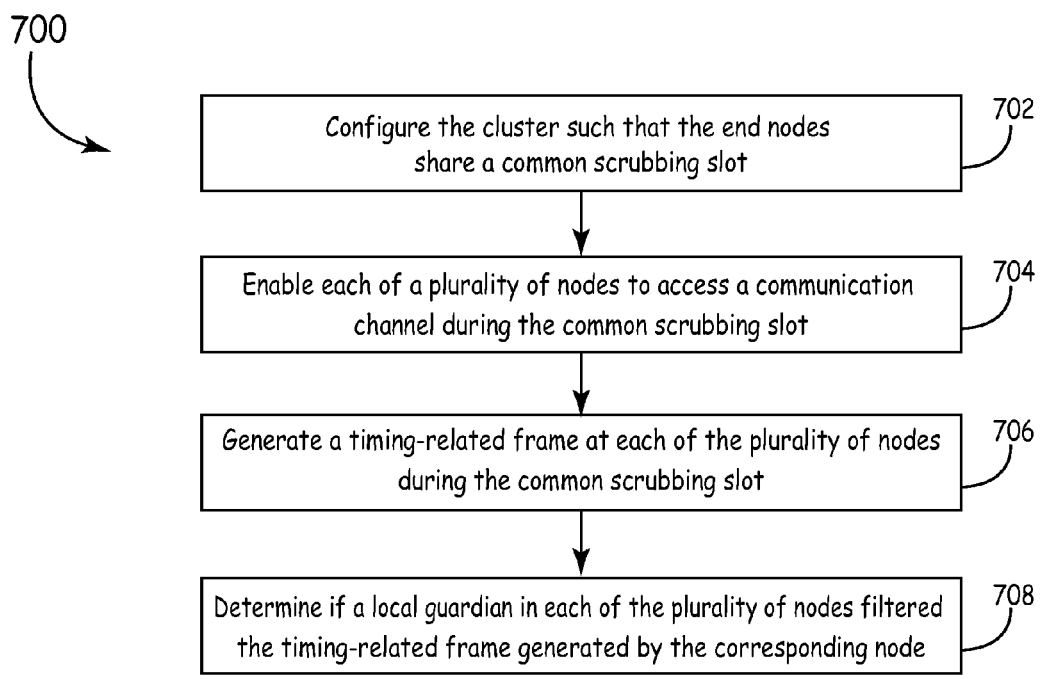

FIG. 7. is a flow chart depicting an exemplary method of monitoring latent faults Like reference numbers and designations in the various drawings indicate like elements. In accordance with common practice, the various described features are not drawn to scale but are drawn to emphasize specific features relevant to the exemplary embodiments

DETAILED DESCRIPTION

In the following detailed description, reference is made to the accompanying drawings that form a part hereof, and in which is shown by way of illustration specific illustrative embodiments. However, it is to be understood that other embodiments may be utilized and that logical, mechanical, and electrical changes may be made. Furthermore, the method presented in the drawing figures and the specification is not to be construed as limiting the order in which the individual acts may be performed. The following detailed description is, therefore, not to be taken in a limiting sense.

In one embodiment, the techniques, devices, and methods described herein are implemented so as to support the FlexRay Protocol Specification V2.1 Rev.A and Protocol Specification V2.1. Rev. A Errata V1, which is incorporated herein by reference in its entirety. It is to be understood that, although the techniques, devices, and methods described have been described in connection with particular embodiments that support the FlexRay protocol, these techniques, devices, and methods can be used with other protocols and the innovation described shall not necessarily be construed as limited to use with the FlexRay protocol. For example, these techniques, devices, and methods can be used with other distributed time-triggered protocols.

One benefit enabled by the embodiments described herein is the in situ testing of local guardians. That is, the local guardians are tested without interrupting the normal state of the system in which they are being used. Thus, the local guardians can be tested while the system is running. In addition, the embodiments described herein mitigate the risk of inadvertently injecting faults into the system while testing the local guardians.

Figure 1:
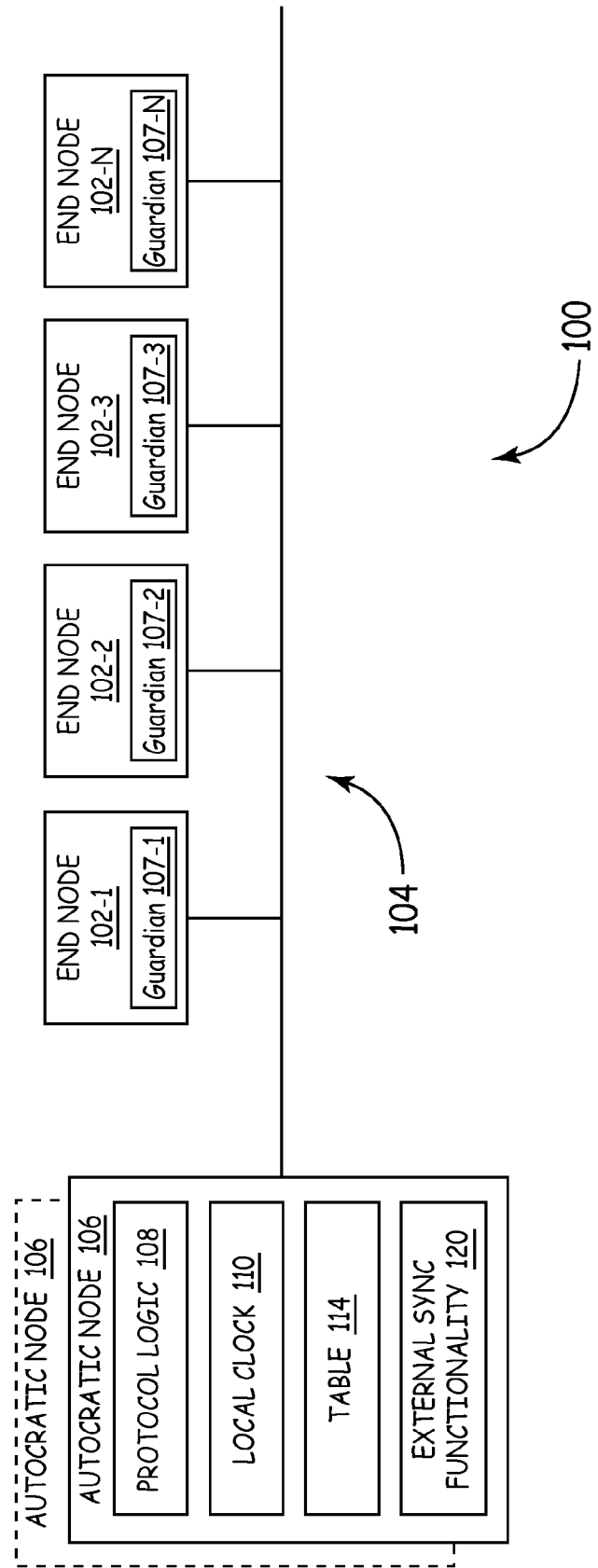

FIG. 1 is a block diagram of one embodiment of a cluster 100 having a "special" node 106 (also referred to here as "autocratic node" 106 or "AN" 106) that sources all valid FlexRay timing/startup-related frames (for example, all FlexRay startup, integration, and synchronization protocol frames). The timing/startup-related frames are also referred to herein simply as timing-related frames. The cluster 100, in this example, comprises a plurality of COTS FlexRay end nodes 102 in which a logical communication channel 104 is implemented using a bus or peer-to-peer topology. One or more autocratic nodes 106 are used in the cluster 100 of FIG. 1. In such an embodiment, the cluster 100 is configured so that all synchronization or startup or integration frames are validly sourced from only the one or more autocratic nodes 106. The autocratic node 106 comprises protocol logic 108, local clock 110, and a table 114. In such an embodiment, the protocol logic 108 implements a portion of the FlexRay protocol that enables the autocratic node 106 to source startup, integration, and synchronization frames in order to dictate the master time line for the cluster 100. Since the autocratic node 106 dictates what the master time base is, the autocratic node 106 need not perform the FlexRay clock synchronization specified in the FlexRay specification. In one implementation, the master time line that the autocratic node 106 establishes is based on its local clock 110. In another implementation, the autocratic node 106 comprises external synchronization functionality 120 of the type described in the '611 application that synchronizes the master time line used by the autocratic node 106 to an external time base (for example, an external time base used by another network).

Figure 2:
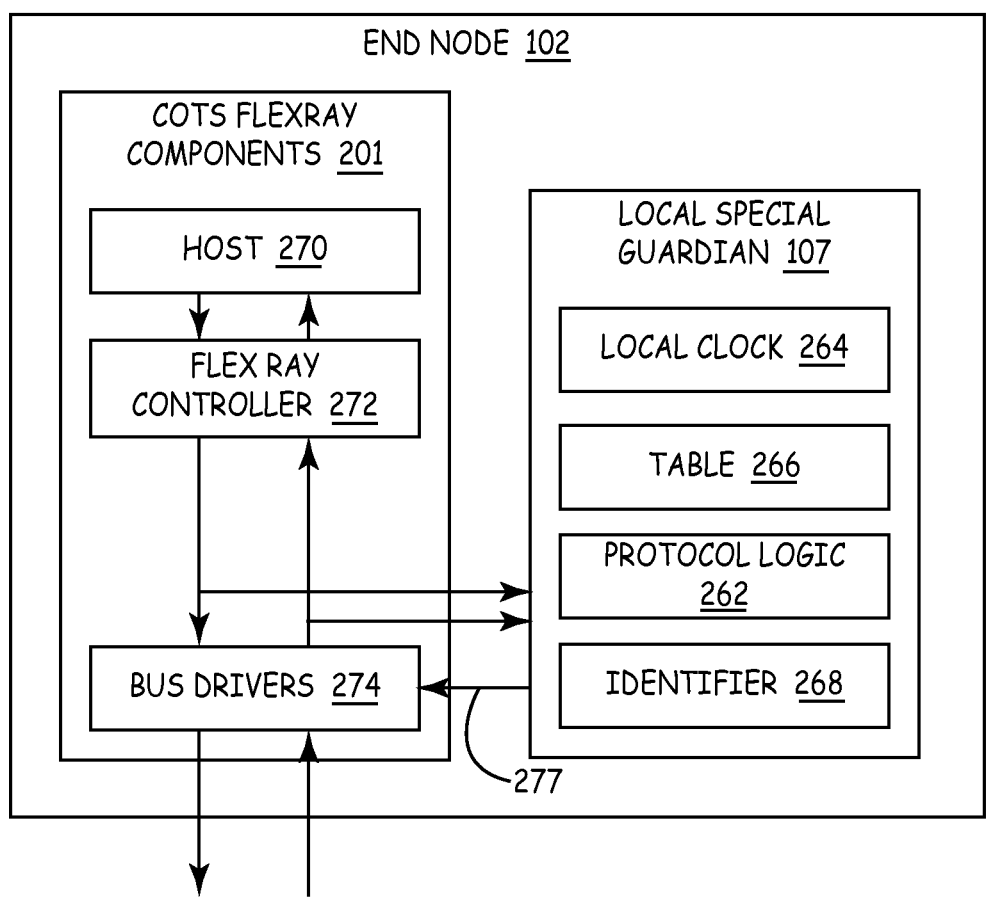
FIG. 2 is a block diagram of one embodiment of an exemplary node in a the cluster of FIG. 1.

When the autocratic node 106 of FIG. 1 is used in the cluster 100, a respective special local guardian functionality 107 is used at each of the end nodes 102. FIG. 2 is a block diagram of one embodiment of an end node 102 that includes special local guardian functionality 107. In this embodiment, the special local guardian functionality 107 (also referred to here as the "special local guardian", "local guardian," or "special guardian") is implemented in a low-complexity manner.

The end node 102 also comprises COTS FlexRay components 201 shown in FIG. 2. More specifically, the COTS FlexRay components 201 comprise a host 270 that executes application software that provides and uses the data that is communicated over the cluster 100. For example, in one implementation, the host 270 is a microprocessor executing a safety-critical control application. The host 270 communicates with the other end nodes 102 in the cluster 100 using a FlexRay protocol communication controller 272 that implements FlexRay protocol logic (for example, FlexRay timing control, clock synchronization, and startup, error, and message handling). The COTS FlexRay end node 102 also typically comprises one or more bus drivers 274 that couples the FlexRay communication controller 272 to the communication media that is used to implement the one or more communication channels 104 to which the end node 102 is coupled. The bus driver 274 does not permit data to be transmitted from the FlexRay communication controller 272 onto the communication channel 104 or data to be received at the FlexRay communication controller 272 from the communication channel 104 unless a bus driver enable signal 277 is asserted. The local guardian 107 monitors data that is transmitted on the communication channels 104 and only permits the end node 102 to transmit on the communication channel 104 during those time slots in which the end node 102 is scheduled to transmit in a conventional manner.

The special local guardian functionality 107 also performs semantic filtering of all frames transmitted from the end node 102. Any such transmitted frames that have synchronization or cold-start bits set are truncated by the special local guardian functionality 107 by immediately disabling the bus driver 274 forcing an invalid frame by de-asserting the bus driver enable signal 277. Hence, the special local guardian functionality prevents the end nodes 102 from interfering with the FlexRay synchronization and start up operation in the cluster 100. In addition, the special local guardian 107 enforces the TDMA slot order based on enforcement data messages, as described in more detail below.

The local guardian 107 is configured to provide feedback to the local host 270 when the local guardian 107 takes enforcement action. For example, the local guardian can set a bit or send a signal that is monitored locally by the host 270. A separate bit can be set for different types of violations that are prevented by the local guardian 107. For example, one bit can be reserved for observed synchronization violations, another bit for violations of the temporal policy, and another bit for semantic filtering, etc. In addition, in some embodiments, the local guardian 107 clears the bits used for feedback before a scrubbing slot, described in more detail below.

In one embodiment, the cluster 100 includes a fail-passive self-checking pair of autocratic nodes 106 that sources start-up and synchronization frames. The special local guardian functionality 107 synchronizes to the FlexRay timeline dictated by the self-checking pair in a simple master/slave fashion. The protocol logic 262 of the special local guardian functionality 107 uses the received start-up and sync frames to align its local schedule (using the local clock 264 and table 266). Thus, the local guardian functionality 107 does not need to implement the more complex FlexRay integration procedure. In addition, since the local guardians 107 check timing using messages sent from the autocratic node 106, the local guardians 107 do not require an independent clock. That is, the local guardians 107 can share the same clock as the Flexray controller 272, thus, reducing cost of the nodes 102.

Once synchronized to the FlexRay timeline, the local guardian functionality 107 enforces compliance to the FlexRay communication schedule by only enabling the bus driver 274 when the respective end node 102 is scheduled to transmit. For example during time slots that are assigned to that end node 102 and during the dynamic segment. The special local bus guardian functionality 107 prevents the end node 102 from sending until it is synchronized by de-asserting the bus driver enable signal 277. That is, after power up, the special local bus guardian functionality 107 blocks the local end node 102 from sending until the special local bus guardian functionality 107 is synchronized to the autocratic node 106 in that cluster 100. To implement this enforcement, the special local bus guardian functionality 107 uses knowledge of the FlexRay communication cycle parameters, for example length of static and dynamic segments, slot length, and which slot/slot(s) are assigned to the respective end node 102, which it stores in table 266. This configuration information may be supplied locally, for example via a SPI connection to a local host computer, a local read-only memory or remotely via the designated FlexRay payloads (as described in more detail below).

The special local bus guardian functionality 107 ensures that the respective end node 102 only sends in the time slot or slots assigned to that end node 102 (according to the schedule information). In one embodiment, the special local bus guardian functionality 107 only enables the bus driver 274 for time slots where the respective end node 102 is scheduled to send as specified by the supplied schedule information. In another embodiment, if the respective end node 102 were to transmit outside of its scheduled slot, the special local bus guardian functionality 107 detects this and, by disabling the bus driver 274, causes the transmitted frame to be truncated, which results in an invalid frame at all the receiving nodes 102 in the cluster 100. As indicated earlier all frames that leave the special local bus guardian functionality 107 are semantically filtered to prevent the erroneous propagation of start-up and synchronization protocol frames. Optionally, increased semantic filtering (for example, filtering for frame identifier correctness, etc.) may also be performed by the special local bus guardian functionality 107.

In another embodiment, the information required for the special local bus guardian functionality 107 to perform schedule enforcement may be sourced via the synchronization and start-up frames that the special local bus guardian functionality 107 uses for integration. That is, the configuration information can be supplied via the autocratic enforcement data messages as described in more detail below. The configuration data supplied in such frames includes the information needed for schedule enforcement (that is, the length of static and dynamic segments, slot length, and which slot/slot(s) are assigned to the end node 102, current slot position and length of dynamic segment, etc.). Since the payload of such frames incorporates the configuration data required for all end nodes 102 in the cluster 100, the special bus guardian functionality 107 uses a locally assigned guardian identifier 268 (which is supplied locally (for example via pin strapping or from read only storage) to identify which bytes of the configuration data are assigned to that special local guardian 107. Since this information is sourced from a fail-passive autocratic node 106, in this embodiment, the special local bus guardian functionality 107 may accept and trust the information as sourced.

Alternatively the special local bus guardian functionality 107 may confirm the configuration by checking the same data from multiple time slots, as discussed above. In some such embodiments, the special local guardian functionality 107 does not calculate payload CRCs, as described above, since the data may be confirmed by performing a bit-for-bit comparison of multiple transmissions. Redundant coding within a single payload may also be used.

It is to be understood that the simplified local guardian functionality can be used in FlexRay networks that include one or more low complexity autocratic nodes as described herein and in FlexRay networks that do not include one or more low complexity autocratic nodes.

The local guardians 107, in this example, are implemented as low-complexity devices that can be added to all end nodes 102 to protect against failures of the COTS FlexRay protocol components. For example, the local guardians 107 are implemented as programmable logic devices (PLD) in this example. The exemplary local guardians 107 in FIG. 1 are configured with two functions. The first function is to filter local protocol transmissions to ensure that neither the start-up nor synchronization identifier header fields are set in frames from the respective local end node 102. As used herein, the term "local" refers to components corresponding to the same node. For example, the local protocol transmissions corresponding to guardian 107-1 are transmissions from end node 102-1. The second function of guardians 107 is to enforce the FlexRay TDMA slot access order by only enabling the respective node's local host 270 to drive the network during the assigned slot or slots.

Each guardian 107 recovers the guardian network protection parameters at run-time by processing transmissions of the autocratic node 106. The transmissions from the autocratic node 106 are unique since they are the only transmissions that have both the start-up frame identifier and synch frame identifier set. Thus, the exemplary guardians 107 do not require persistent tables. In addition to reducing complexity of the protection components, not using persistent tables also reduces the cost of the guardians 107 since they do not require non-volatile memory to store the persistent tables.

To seed the local guardian tables in each guardian 107, the leading bytes of an autocratic message payload are reserved for the guardian parameters. An autocratic message is a message or frame sent from the autocratic node 106. An autocratic message used to seed the local guardian tables is referred to herein as an autocratic enforcement data message. The format of an exemplary autocratic enforcement data message 300 is shown in FIG. 3.

The exemplary enforcement data message format shown in FIG. 3 includes eighteen 16-bit words numbered 0-17. The most significant bit of the first word, bit 15 in word 0, is designated as a synch bit. The remaining 15 bits of the first word are used to denote the TDMA slot size, in bit times. The 16 words following word 0, i.e. words 1-17, are used to communicate the TDMA sending order for each node 102 of the system. Each of words 1-17 comprises a slot enforcement bit vector, where a value of '1' indicates that the corresponding node 102 is permitted to drive the bus in this slot, and a value of '0' indicates the slot is disabled for the corresponding node. Each local guardian 107 has a unique NODE ID configured by parity protected pin strapping that indicates to which of the 16 bit vectors it relates. In addition, in some embodiments, a bit can be designated as a multiplexing bit. When the multiplexing bit is set, two successive frames are multiplexed together which enables the use of more than 16 slots. For example, bit 14 can be designated as the multiplexing bit.

In some embodiments, each node's local guardian 107 compares two autocratic node transmissions for bit for bit equivalence in place of using cyclic redundancy check (CRC) circuitry to verify the integrity of the autocratic node transmissions. If the parameters in the two transmissions match, the identical parameters are seeded into the respective local guardian tables and the guardian transitions to an active mode. That is, prior to active mode, each local guardian 107 prevents node access to a slot by disabling its respective local controller 105.

As mentioned above, to synchronize to the phase of the TDMA round, the most significant bit, the 15th bit of the word 0, is designated as a synch bit. This synch bit is only set to '1' in a unique slot in the TDMA round. Once active on detection of the synch bit, this slot is used as the basis of the slot enforcement bit vector fields.

The system 100 is also configured to implement a guardian scrubbing function. The guardian scrubbing function monitors the local guardians 107 for latent faults. In particular, each local guardian 107 is configured to perform the following functions: 1) truncate frames transmitted from its corresponding local node 102 that have the startup frame identifier set; 2) truncate frames transmitted from its corresponding node 102 that have the synch frame identifier set; and 3) enforce the TDMA slot order. To monitor for latent faults, the above functions of the local guardians 107 are tested in situ.

Figure 4:
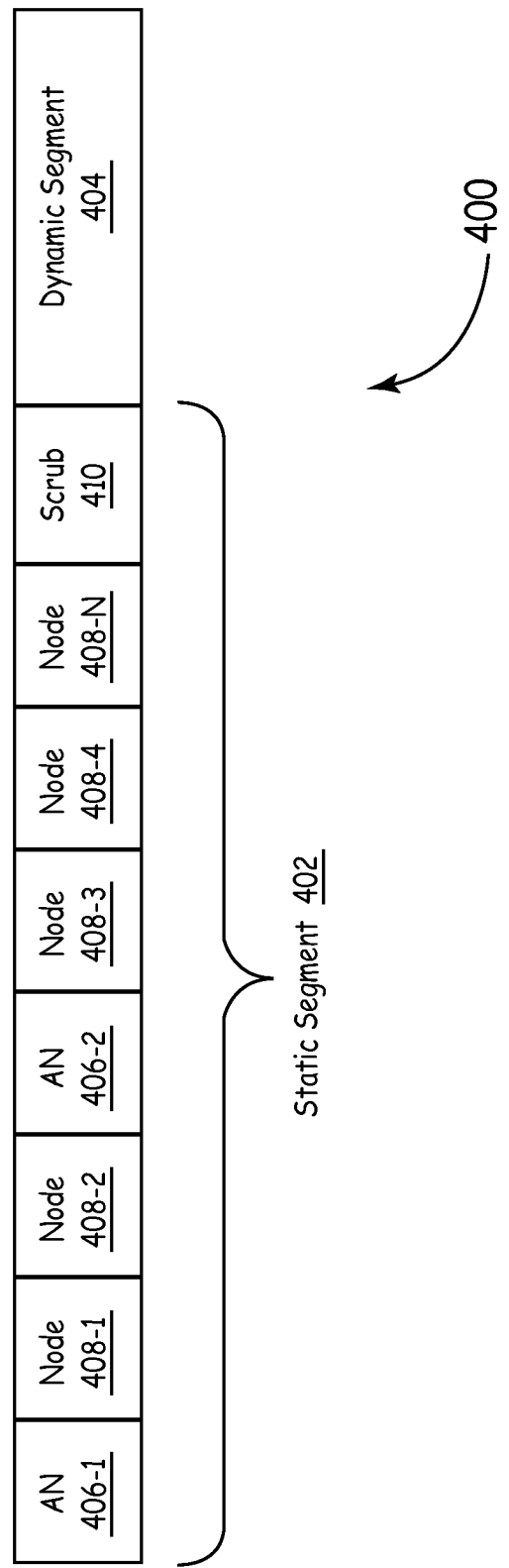
FIG. 4 illustrates one example of a schedule used in the embodiment of FIG. 1.

To enable the in situ testing or scrubbing, a slot, referred to herein as a scrubbing slot, is added to the static segment of the TDMA schedule. One exemplary schedule 400 having a scrubbing slot 410 is shown in FIG. 4. The exemplary schedule 400 comprises a FlexRay communication cycle, which for each round, specifies a static segment 402 and a dynamic segment 404. A TDMA access scheme is used during the static segment 402. The static segment 402 in this example comprises a plurality of time slots. Each of the end nodes 102 is assigned at least one time slot 408 in which to transmit. Also, as shown in FIG. 4, two TDMA time slots 406-1 and 406-2 are assigned to the autocratic node 106. The static segment also includes a scrubbing slot 410. However, it is to be understood that, in other embodiments, the scrubbing slot is 410 is included in the dynamic segment 404. During the dynamic segment 404, a mini-slot access method is used to provide the end nodes 102 with dynamic access to the communication channel.

During each time slot 406 assigned to the autocratic node 106, the autocratic node 106 transmits particular frames (for example, synchronization or integration frames) that are sourced from the autocratic node 106 itself. During the scrubbing slot 410, the local communication controller 105 in each end node 102 is configured to send frames to stimulate the monitor fault containment logic in the respective local guardian 107. For example, one or both of the start-up frame identifier and the synchronization frame identifier can be set for messages sent by the communication controller 105 in each of the end nodes 102. In particular, in some embodiments, each communication controller 105 is configured to send, during a first round, a frame with the start-up frame identifier set; during a second round, a frame with the synchronization frame identifier set; and during a third round, a frame with the synchronization frame identifier and start-up frame identifier set. Thus, the frames are different in each round which improves the ability to separately monitor containment of the different faults. In addition, in some embodiments, all of the frames transmitted by the end nodes 102 during the scrubbing slot 410 are configured to have an invalid header CRC. Thus, the frames transmitted during the scrubbing slot 410 do not influence the running cluster even if the local guardian fails to contain the faulty frame. Additionally, the scrubbing slot 410 is also referred to herein as a common scrubbing slot 410 since the slot is common to the plurality of end nodes 102. Thus, the term "common scrubbing slot" as used herein refers to a slot in which more than one end node 102 transmits a frame to stimulate the monitor fault containment logic in the respective local guardian 107.

In implementing the scrubbing action, the autocratic node 106 distributes the schedule to the local guardians 107. For example, the autocratic node 106 can send two agreeing transmissions that indicate the guardian vectors which determine the slots for each node 102 to transmit. In normal operation, each of the local guardians 107 is configured to disable transmission from its respective node 102 during the scrubbing slot. The autocratic node 106 then sequentially enables access to the scrubbing slot. For example, the autocratic node 106 changes the distributed schedule in a sequence to first allow node 1 to send, then to allow node 2, etc. In this manner, a plurality of nodes 102 transmit sequentially during the scrubbing slot which enables the autocratic node 106 to identify which node, if any, failed to contain the faulty test transmission.

In particular, the autocratic node 106 monitors the bus for activity during the scrubbing slot. The autocratic node 106 is monitoring for an expected pattern on the bus. For example, when an end node 102 transmits a synchronization frame having the synch frame bit set, the autocratic node 106 expects to observe a truncated frame on the bus after the synch frame bit. Since each node has a unique header, the autocratic node 106 can identify which node properly truncated the frame. In addition, since the nodes are enabled sequentially, the autocratic node 106 expects to observe a pattern of truncated frames in the order in which the nodes are enabled to transmit. Furthermore, in some embodiments, the autocratic node 106 is configured to determine the status of each end node 102 by monitoring for a feedback signal from the respective local guardian, such as the feedback signal provided from the local guardian to the local host described above. The feedback signal can be used in addition to or in lieu of monitoring for an expected pattern on the bus. In addition, the feedback signal can be provided immediately using the nodes normal assigned slot or saved and provided at a later point in time.

In some embodiments, the local guardian 107 in each end node 102 is nominally configured, via the corresponding enforcement bit vector parameter discussed above, to disable access to the communication channel 104 by the corresponding local communications controller 105 during the scrubbing slot 410. To perform the in situ testing during the scrubbing slot 410, in such embodiments, the autocratic node 106 enables each respective node 102 to drive the communication channel 104 during the scrubbing slot. For example, the autocratic node 102 sequentially enables the nodes 102 to drive the communication channel 104 by changing the respective node's TDMA enforcement bit vector. Thus, no node programming is required to implement the scrubbing or latent fault monitoring described herein.

In one simple implementation of the embodiment shown in FIG. 1, the protocol logic 108 is implemented in a low-complexity manner using a state machine 112 (for example, using a programmable device, application-specific integrated circuit, or other suitable implementation technique) and a table 114 (implemented, for example, using a suitable volatile or non-volatile memory such as content-addressable memory (CAM) memory devices) in which a FlexRay communication schedule for the cluster 100 is stored. The schedule stored in the table 114 specifies which end nodes 102 are scheduled to transmit at each time slot within a given FlexRay communication round. The state machine 112 uses the time base established by the local clock 110 to determine the current position in the schedule stored in the table 114 and what actions the autocratic node 106 should take for that time slot. In other words, the internal message processing and relaying of the autocratic node 106 can be implemented in this way using very simple, table-driven timed operations (for example, by using counter to step through the schedule).

FIG. 6 is a block diagram of another exemplary embodiment of a cluster 600 of end nodes 602. In the particular embodiment shown in FIG. 6, the end nodes 602 communicate with one another over one or more communication channels 604 using a distributed time-triggered communication protocol (for example, the FlexRay protocol). The embodiment shown in FIG. 6 is described here as being implemented to support the FlexRay protocol using standard commercial off the shelf (COTS) FlexRay-compatible end nodes 602, though it is to be understood that, in other embodiments, other distributed time-triggered protocols can be used. In such an embodiment, each COTS FlexRay end node 602 typically comprises a host 603 that executes application software that provides and uses the data that is communicated over the cluster 600. For example, in one implementation, the host 603 is a microprocessor executing a safety-critical control application. The host 603 communicates with the other end nodes 602 in the cluster 600 using a FlexRay protocol communication controller 605 that implements FlexRay protocol logic (for example, FlexRay timing control, clock synchronization, and startup, error, and message handling). The COTS FlexRay end node 602 also typically comprises one or more bus drivers that couples the communication controller 605 to the communication media that is used to implement the one or more communication channels 604 to which the end node 602 is coupled. Moreover, in this embodiment, the end node 602 also optionally comprises one or more local guardians 607 that monitor data that is transmitted on the communication channels 604 and only permits the end node 602 to transmit on the communication channel 604 during those time slots in which the end node 602 is scheduled to transmit.

In this embodiment, the autocratic node 606 sources all valid FlexRay timing-related frames. The autocratic node 606 comprises a suitable interface to communicatively couple the autocratic node 606 to the communication channel 604 over which the autocratic node 606 and the end nodes 602 communicate. Where the end nodes 602 are implemented using COTS FlexRay end nodes 602 that would otherwise source startup, integration, and synchronization frames, any such startup, integration, and synchronization frames that are sourced by the COTS end nodes 602 are prevented from successfully reaching any of the other end node 602 so that the only startup, integration, and synchronization frames that are successfully received by the end nodes 602 are those that are sourced from the autocratic node 606.

By sourcing all of the synchronization frames from the autocratic node 606, the other COTS FlexRay end nodes 602 that are coupled to the cluster 600 simply follow the time sourced from the autocratic node 606 in a conceptual master/slave fashion. It is noted that this master/slave property is achieved even though the COTS FlexRay end nodes 602 are themselves using the ordinary, standard peer-to-peer synchronization mechanism of the underlying FlexRay protocol. Also, as noted above, the autocratic node 606 sources all start-up and integration frames. Since this is the case, the FlexRay protocol implemented by the COTS end node 602 can also align the master time base of autocratic node 606 and with the local time lines of the end nodes 602 immediately on power-up. Hence the long convergence times of traditional, standard peer-to-peer synchronization approaches can be avoided.

In the particular embodiment shown in FIG. 6, the cluster 600 is implemented using a star topology in which the autocratic node 606 serves as an internetworking device that couples the end nodes 602 to one another. However, it is to be understood that other topologies can be implemented in other embodiments as described above.

In this embodiment, each logical communication channel 604 is implemented using point-to-point communication links that couple each end node 602 to a respective port 609 of the autocratic node 606 using a suitable physical communication medium or media (for example, using metallic or optical communication media). The autocratic node 606 comprises a plurality of ports 609 that are used to communicatively couple such point-to-point communication links (and the respective end node 602) to the autocratic node 606. Generally, in such an embodiment, the autocratic node 606 forwards each "valid" frame that is received by the autocratic node 606 from one of the end nodes 602 to a subset of the other end nodes 602 in the cluster 600. However, the autocratic node 606 does not forward or relay timing/startup-related frames that are sourced from the plurality of end nodes 602.

In the particular embodiment shown in FIG. 6, the autocratic node 606 comprises protocol logic 608 that implements a portion of the FlexRay protocol. The autocratic node 606 also comprises a local clock 610 that is used to establish the master time base. The autocratic node 606 imposes its master time base on the cluster 600 by sourcing synchronization protocol frames in accordance with that master time base. Since the autocratic node 606 dictates what the master time base is, the autocratic node 606 need not perform the FlexRay clock synchronization specified in the FlexRay specification. That is, the protocol logic 608 establishes the master time base without regard to any timing/startup-related frames sourced from any of the plurality of end nodes 602.

Similarly since the autocratic node 606 sources all of the protocol integration and startup frames communicated in the cluster 600, the autocratic node 606 does not need to implement the complicated FlexRay start-up and integration protocol functionality; once again this behavior is dictated by the master time-line dictated by the autocratic node 606.

The cluster 600 is configured such that all cold-start and synchronization frames are sourced from the autocratic node 606. Such a strategy therefore inherently reduces the degree of protocol interdependency and coupling between the autocratic node 606 and the COTS FlexRay end nodes 602.

In one implementation of the embodiment shown in FIG. 6, the autocratic node 606 forwards each valid frame received from one of the COTS FlexRay end nodes 602 to all of the other COTS FlexRay end nodes 602. In other implementations of the embodiment shown in FIG. 6, the autocratic node 606 forwards each valid frame received from one of the COTS FlexRay end nodes 602 to a subset of the other COTS FlexRay end nodes 602. In one such alternative implementation, the COTS FlexRay end nodes 602 to which the autocratic node 606 forwards a particular valid frame is determined (at least in part) by information stored in the table 614. For example, the schedule stored in the table 614 can specify, for each time slot, the COTS FlexRay end nodes 602 that are permitted to transmit during that time slot and to which end nodes 602 the autocratic node 606 is to forward valid frames transmitted by those scheduled end nodes 602. Thus, it is possible to schedule multiple, simultaneous multi-cast groups. In other such implementations, the COTS FlexRay end nodes 602 to which the autocratic node 606 forwards a particular valid frame is determined (at least in part) by information included in the valid frame. Moreover, it is to be understood that the forwarding performed by the autocratic node 606 can be implemented using cut-through switching and/or store-and-forward switching.

In the embodiment shown in FIG. 6, the time base that the autocratic node 606 uses to create the startup, integration, and synchronization frames that it sources is derived only from a local clock 608 (or other source of clock information) resident at the autocratic node 606.

Since by configuration the autocratic node 606 is the only source of the protocol cold-start and synchronization frames, the autocratic node 606 can contain protocol failure by simply filtering the state of the cold-start and sync bits of all frames that are relayed by the COTS end node 602. This is a kind of "dumb" frame-level enforcement. An exemplary format of FlexRay frames is illustrated in FIG. 5. As shown in FIG. 5, the FlexRay frame format contains a sync frame indicator bit 502 and a startup frame indicator bit 504. If the autocratic node 606 receives a frame sourced from a COTS FlexRay end node 602 containing an erroneously set sync or cold-start bit, the autocratic node 606 simply truncates the frame and does not relay that frame to the other COTS FlexRay end nodes 602.

FIG. 7 is a flow chart depicting an exemplary method 900 of monitoring latent faults. Method 900 can be implemented in a cluster such as cluster 100 described above. At block 702, the cluster is configured such that each of the end nodes, such as end nodes 102, share a common scrubbing slot. For example, in some embodiments, an autocratic or special node transmits an enforcement data message to each of the nodes. The enforcement data message contains schedule information indicating that each of the corresponding nodes is permitted to access the communication channel during the common scrubbing slot. At block 704, each of a plurality of nodes is enabled to access a communication channel during a common scrubbing slot according to a schedule. For example, in some embodiments, the nodes are sequentially enabled access to the communication channel during the common scrubbing slot. That is, the nodes are enabled access in a sequential order.

At block 706, each of the plurality of nodes generates a timing-related frame. In particular, in some embodiments, each of the plurality of nodes generates a timing-related frame having at least one of a start-up frame identifier and a synch frame identifier set. For example, in some embodiments, each of the plurality of nodes generates a timing-related frame having a start-up frame identifier set in a common scrubbing slot of a first round in the schedule. In the common scrubbing slot of a second round in the schedule, each of the plurality of nodes generates a timing-related frame having a synch frame identifier set. In addition, in some embodiments, the timing-related frame generated by each of the plurality of nodes has an invalid header cyclic redundancy check (CRC) during the common scrubbing slot as described above.

At block 708, it is determined if a local guardian in each of the plurality of nodes filtered the timing-related frame generated by the corresponding node. If the local guardian in one of the plurality of nodes did not filter the timing-related frame during the common scrubbing slot, then a latent fault is identified. For example, a special or autocratic node can be configured to observe the communication channel during the common scrubbing slot to detect whether or not each of the local guardians truncated the corresponding timing-related frame.

The methods and techniques described here may be implemented in digital electronic circuitry, or with a programmable processor executing computer-readable instructions tangibly embodied on a computer-readable medium. The computer readable medium can be implemented as any available media that can be accessed by a general purpose or special purpose computer or processor, or any programmable logic device. Suitable processor-readable media may include storage or memory media such as magnetic or optical media. For example, storage or memory media may include conventional hard disks, Compact Disk-Read Only Memory (CD-ROM), volatile or non-volatile media such as Random Access Memory (RAM) (including, but not limited to, Synchronous Dynamic Random Access Memory (SDRAM), Double Data Rate (DDR) RAM, RAMBUS Dynamic RAM (RDRAM), Static RAM (SRAM), etc.), Read Only Memory (ROM), Electrically Erasable Programmable ROM (EEPROM), and flash memory, etc. Suitable processor-readable media may also include transmission media such as electrical, electromagnetic, or digital signals, conveyed via a communication medium such as a network and/or a wireless link. Any of the foregoing may be supplemented by, or incorporated in, specially-designed application-specific integrated circuits (ASICs).

Although specific embodiments have been illustrated and described herein, it will be appreciated by those of ordinary skill in the art that any arrangement, which is calculated to achieve the same purpose, may be substituted for the specific embodiments shown. Therefore, it is manifestly intended that this invention be limited only by the claims and the equivalents thereof.

The invention claimed is:

1. A cluster comprising:
a plurality of end nodes that communicate with one another over at least one communication channel using a distributed time-triggered communication protocol, each end node assigned a time slot in a transmission schedule for transmission of frames; wherein each node comprises a local guardian configured to prevent transmission of timing-related frames sourced from the respective end node; and
a special node that communicates with the plurality of end nodes over the communication channel, wherein the special node comprises protocol functionality to establish a time base to use in communicating with the plurality of end nodes and to source timing-related frames to the plurality of end nodes in accordance with the distributed time-triggered communication protocol;
wherein the transmission schedule includes at least one common scrubbing time slot during which each of the plurality of end nodes is configured to generate a timing-related frame, wherein the at least one common scrubbing time slot is a time slot in which more than one of the plurality of end nodes generates a frame to stimulate monitor fault containment logic in the respective local guardian;
wherein the special node is configured to observe the at least one communication channel during the common scrubbing time slot to determine if the local guardian in any of the plurality of nodes failed to prevent transmission of the respective generated timing-related frame.

2. The cluster of claim 1, wherein each of the plurality of end nodes is configured to generate a timing-related frame having a start-up frame identifier set during a first common scrubbing time slot and to generate a timing-related frame having a synch frame identifier set during a second common scrubbing time slot.

3. The cluster of claim 1, wherein each of the plurality of end nodes is configured to generate a timing-related frame having an invalid header cyclic redundancy check (CRC) during the at least one common scrubbing time slot.

4. The cluster of claim 1, wherein the special node is configured to provide an enforcement data message to each of the plurality nodes, wherein the enforcement data message contains data used by the local guardian in each of the plurality of end nodes to enforce the transmission schedule.

5. The cluster of claim 4, wherein the special node is configured to sequentially enable each of the plurality of nodes to drive the at least one communication channel during the at least one common scrubbing time slot via the enforcement data message.

6. The cluster of claim 1, wherein the cluster comprises a star network topology in which the special node communicatively couples the end nodes to one another, wherein the special node forwards validly received frames from the plurality of end nodes to at least a subset of the plurality of end nodes.

7. The cluster of claim 1, wherein the cluster comprises at least one of a bus topology and peer-to-peer topology.

8. The cluster of claim 1, wherein the distributed time-triggered protocol comprises the FlexRay protocol.

9. A node comprising:
a distributed time-triggered communication protocol controller;
a bus driver to communicatively couple the distributed time-triggered communication protocol controller to a communication channel; and
local guardian functionality to enforce a schedule using an established time base, the schedule including a common scrubbing slot; wherein the common scrubbing slot is a slot in which more than one node generates a frame to stimulate monitor fault containment logic in respective local guardian functionality;
wherein the local guardian functionality also truncates timing-related frames sourced from the distributed time-triggered communication protocol controller;
wherein the distributed time-triggered communication protocol controller is further configured to source a timing-related frame during the common scrubbing slot in which a plurality of other nodes also source a timing-related frame.

10. The node of claim 9, wherein the distributed time-triggered protocol controller comprises a FlexRay protocol controller.

11. The node of claim 9, wherein the distributed time-triggered protocol controller is configured to generate a timing-related frame having a start-up frame identifier set during a common scrubbing slot in a first round of the schedule and to generate a timing-related frame having a synch frame identifier set during a common scrubbing slot in a second round of the schedule.

12. The node of claim 9, wherein the distributed time-triggered protocol controller is configured to generate a timing-related frame having an invalid header cyclic redundancy check (CRC) during the common scrubbing slot.

13. The node of claim 9, wherein the local guardian functionality is configured to extract schedule information from a message sent from a special node designated to source timing-related frames.

14. The node of claim 13, wherein the local guardian functionality is configured to compare two redundant messages sent from the special node for bit for bit equivalence to verify the integrity of the two messages.

15. A method of monitoring latent faults in a distributed time-triggered protocol cluster comprising at least one special node and a plurality of end nodes, the method comprising:
  enabling each of the plurality of nodes to access a communication channel during a common scrubbing slot of a schedule, wherein the common scrubbing slot is a slot in which more than one node generates a frame to stimulate monitor fault containment logic in a respective local guardian in each of the plurality of nodes;
  generating a timing-related frame at each of the plurality of nodes during the common scrubbing slot; and
  determining if the respective local guardian in each of the plurality of nodes filtered the timing-related frame generated by the corresponding node, wherein a latent fault is identified if the respective local guardian in one of the plurality of nodes did not filter the timing-related frame.

16. The method of claim 15, wherein generating a timing-related frame at each of the plurality of nodes comprises generating a timing-related frame having an invalid header cyclic redundancy check (CRC).

17. The method of claim 15, wherein enabling each of the plurality of nodes to access the communication channel comprises sequentially enabling each of the plurality of nodes to access the communication channel during the common scrubbing slot.

18. The method of claim 15, wherein enabling each of the plurality of nodes to access the communication channel comprises transmitting an enforcement data message to each of the plurality of nodes from a special node designated to source timing-related frames, wherein the enforcement data message contains schedule information indicating that the corresponding node is permitted to access the communication channel during the common scrubbing slot.

19. The method of claim 15, wherein generating a timing-related frame at each of the plurality of nodes comprises:
  generating a timing-related frame having a start-up frame identifier set during a common scrubbing slot in a first round of the schedule; and
  generating a timing-related frame having a synch frame identifier set during a common scrubbing slot in a second round of the schedule.

20. The method of claim 15, wherein enabling each of the plurality of nodes to access the communication channel comprises enabling each of a plurality of FlexRay nodes to access the communication channel.

\* \* \* \* \*